(12) United States Patent
Yamada (10) Patent No.: US 11,782,556 B2
(45) Date of Patent: Oct. 10, 2023

(54) CAPACITIVE SENSOR, CAPACITANCE DETECTION METHOD, AND CAPACITANCE DETECTION PROGRAM

(71) Applicant: Alps Alpine Co., Ltd., Tokyo (JP)

(72) Inventor: Tomoki Yamada, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 17/728,309

(22) Filed: Apr. 25, 2022

(65) Prior Publication Data

US 2022/0244832 A1    Aug. 4, 2022

Related U.S. Application Data

(63) Continuation of application No. PCT/JP2020/038027, filed on Oct. 7, 2020.

(30) Foreign Application Priority Data

Nov. 19, 2019    (JP) ................. 2019-209025

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01); *G06F 3/04182* (2019.05)

(58) Field of Classification Search
CPC ... G06F 3/04186; G06F 3/04182; G06F 3/044
See application file for complete search history.

(56) References Cited

U.S. PATENT DOCUMENTS

| | | |
|---|---|---|
| 2015/0212623 A1 | 7/2015 | Hatano et al. |
| 2019/0107918 A1 | 4/2019 | Terao |
| 2020/0050341 A1 | 2/2020 | Tabata |

FOREIGN PATENT DOCUMENTS

| | | |
|---|---|---|
| JP | 2015-141557 | 8/2015 |
| JP | 2019-23012 | 2/2019 |
| JP | 2019-71020 | 5/2019 |
| WO | 2018/193711 | 10/2018 |

OTHER PUBLICATIONS

International Search Report from International Application No. PCT/JP2020/038027 dated Dec. 28, 2020.
Written Opinion from International Application No. PCT/JP2020/038027 dated Dec. 28, 2020.

*Primary Examiner* — Michael Pervan
(74) *Attorney, Agent, or Firm* — Beyer Law Group LLP (57) ABSTRACT

A capacitive sensor includes a sensor unit including a detection electrode, a capacitance detection unit configured to detect a capacitance value of the detection electrode of the sensor unit, a difference value calculation unit configured to calculate a difference value between the capacitance value and a reference value, a filter calculation unit configured to perform a time-directional filtering process using a filter parameter on the difference value and calculate a filter calculation value, a determination unit configured to determine a condition around the sensor unit on the basis of the filter calculation value calculated by the filter calculation unit, and a filter parameter calculation unit configured to calculate the filter parameter on the basis of the difference value calculated by the difference value calculation unit.

13 Claims, 6 Drawing Sheets

CAPACITIVE SENSOR, CAPACITANCE DETECTION METHOD, AND CAPACITANCE DETECTION PROGRAM

CLAIM OF PRIORITY

This application is a Continuation of International Application No. PCT/JP2020/038027 filed on Oct. 7, 2020, which claims benefit of Japanese Patent Application No. 2019-209025 filed on Nov. 19, 2019. The entire contents of each application noted above are hereby incorporated by reference.

BACKGROUND OF THE INVENTION

1. Field of the Invention

The present invention relates to a capacitive sensor, a capacitance detection method, and a capacitance detection program.

2. Description of the Related Art

The detection principle for a capacitive sensor is mainly used in touch input devices, such as touch panels and touch pads. Since the capacitive sensor is essentially a sensor that detects a value in accordance with the capacitance between the sensor and the GND (the human body), an object can be detected even when the object does not touch the sensor (the object is in the air). Therefore, for example, glove compatible touchpads and sensors that allow the operation through aerial gestures have been developed using a highly sensitive detection circuit. However, since the capacitance value decreases in accordance with the distance from the capacitive sensor to the object, a high S/N ratio (signal/noise ratio) is required to stably detect a distant object.

Japanese Unexamined Patent Application Publication No. 2019-71020 describes a touch panel that changes a threshold value for determining the presence or absence of touch in accordance with the amount of noise. That is, when the noise level is low, the threshold value is decreased and, thus, the touch panel enters an operability oriented mode that enables a light touch operation. In contrast, when the noise level is high, the threshold value can be increased and, thus, the touch panel enters a high noise immunity mode.

In addition, Japanese Unexamined Patent Application Publication No. 2019-23012 describes a steering wheel that performs a moving average calculation on a predetermined number of the most recent detection values from a capacitive sensor. The steering wheel prevents noise caused by vehicle vibration or the like by correcting the detected value using the moving average value even if a disturbance occurs.

Japanese Unexamined Patent Application Publication No. 2015-141557 describes a filter unit that changes the noise attenuation characteristic in a lowpass filtering process so that the noise attenuation amount increases with increasing noise amount and decreases with decreasing noise amount.

SUMMARY OF THE INVENTION

However, according to the touch panel described in Japanese Unexamined Patent Application Publication No. 2019-71020, an issue arises that gives the user a different operational feeling (the reaction is different from the previous day) since the threshold value increases with increasing noise (increasing detection distance). In addition, according to the steering wheel described in Japanese Unexamined Patent Application Publication No. 2019-23012, noise can be reduced by averaging processing. However, it is known that in time-directional filtering calculation, such as moving average, there is a trade-off between noise reduction and the responsiveness. Thus, from the point of view of the user, the operation is delayed. Furthermore, according to the filter unit described in Japanese Unexamined Patent Application Publication No. 2015-141557, although the S/N ratio can be kept constant by changing the parameter in accordance with the noise, there is a problem that the filter unit is ineffective in an environment where the noise is constant. In general, to improve the S/N ratio, the data are averaged by using a digital lowpass filter. However, in a digital lowpass filter, there is a trade-off between the strength of the filter determined by the cutoff frequency and the responsiveness of the filter. As a result, in the case of a fixed parameter (a fixed cutoff frequency), one of the S/N ratio and the responsiveness needs to be sacrificed.

Accordingly, the present invention provides a capacitive sensor, a capacitance detection method, and a capacitance detection program that reduce the false operation ratio when an object to be detected is distant and that do not impair the responsiveness when an object to be detected is close to the capacitive sensor.

The capacitive sensor according to an embodiment of the present invention includes a sensor unit including a detection electrode, a capacitance detection unit configured to detect a capacitance value of the detection electrode of the sensor unit, a difference value calculation unit configured to calculate a difference value between the capacitance value and a reference value, a filter calculation unit configured to perform a time-directional filtering process using a filter parameter on the difference value and calculate a filter calculation value, a determination unit configured to determine a condition around the sensor unit on the basis of the filter calculation value calculated by the filter calculation unit, and a filter parameter calculation unit configured to calculate the filter parameter on the basis of the difference value calculated by the difference value calculation unit.

The present invention can provide a capacitive sensor, a capacitance detection method, and a capacitance detection program that reduces the false operation ratio when an object to be detected is distant and that do not impair the responsiveness when an object to be detected is in proximity to the capacitive sensor.

DESCRIPTION OF THE PREFERRED EMBODIMENTS

Embodiments to which a capacitive sensor, a capacitance detection method, and a capacitance detection program according to the present invention are applied are described below.

EMBODIMENTS

Figure 1:
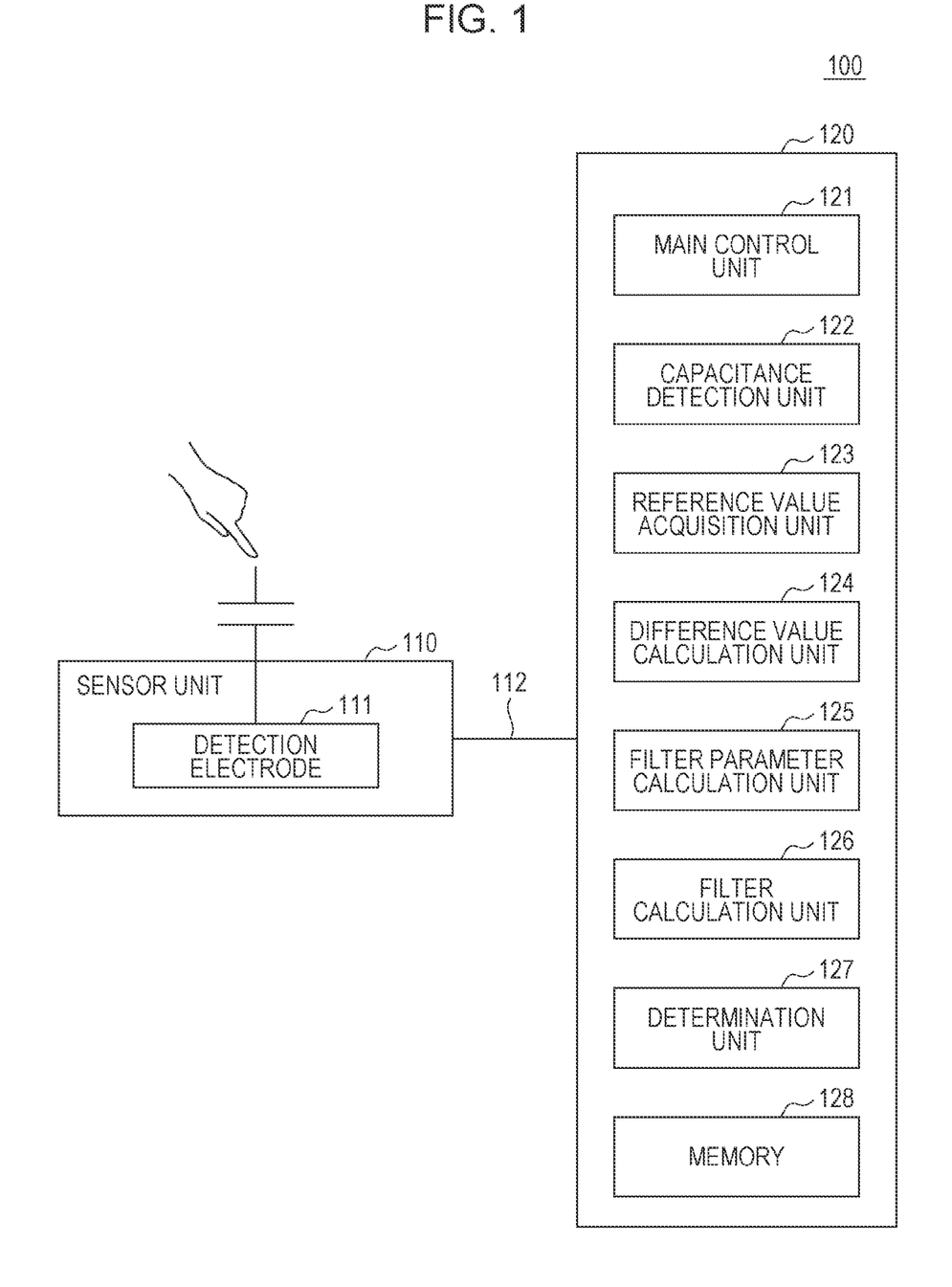
FIG. 1 is a diagram illustrating a capacitive sensor according to an embodiment.

FIG. 1 is a diagram illustrating a capacitive sensor 100 according to an embodiment. The capacitive sensor 100 includes a sensor unit 110 and a processing device 120.

The sensor unit 110 includes a detection electrode 111. The sensor unit 110 can be mounted in various parts, such as an operation unit of a tablet computer, a smartphone, and a game device, or an operation unit of a vehicle door handle or a device in a vehicle interior.

The detection electrode 111 is an electrode having a capacitance that changes in accordance with the proximity of a detection target, such as the human body (for example, a finger) or a pen. FIG. 1 illustrates a single detection electrode 111. The detection electrode 111 is connected to the processing device 120 via wiring 112 provided on a substrate or the like. However, a plurality of electrodes 111 may be provided, and the detection electrode 111 may have a configuration in which a plurality of linear electrodes provided along one of axes extending in two axis directions and a plurality of electrodes provided along the other axis intersect three-dimensionally, and changes in capacitance at the intersections are detected by the processing device 120.

The processing device 120 is implemented using a computer including a CPU (Central Processing Unit), a RAM (Random Access Memory), a ROM (Read Only Memory), an input/output interface, an internal bus, and the like. The processing device 120 detects the capacitance value of the detection electrode 111, performs a filtering process using a digital lowpass filter on the basis of the detected capacitance value, and determines the degree of proximity of the detection target to the sensor unit 110 on the basis of the result obtained through the filtering process.

In addition, the digital lowpass filter has a trade-off between the cutoff frequency and the responsiveness, and the capacitive sensor 100 assumes that the capacitance signal range of the detection electrode 111 is wide. For this reason, the processing device 120 changes the filter characteristics in accordance with the S/N ratio of the capacitance so that a stable operation can be performed even when the signal is low. More specifically, when the S/N ratio of the capacitance is high, the cutoff frequency is increased (the filter is weakened) to improve the responsiveness, and when the S/N ratio of the capacitance is low, the cutoff frequency is decreased (the filter is strengthened) to prioritize noise cutoff over the responsiveness.

Note that at this time, instead of obtaining the S/N ratio of the capacitance and using the obtained S/N ratio to change the filter characteristics, the difference value between the capacitance value and a reference value is used. The reference value is the capacitance value of the detection electrode 111 detected when the processing device 120 determines that the detection target is not in proximity to the sensor unit 110.

When the difference value calculated using the above-described reference value is high, the S/N ratio is high, and when the difference value is low, the S/N ratio is low. For this reason, if the filter characteristics are changed using the difference value, the filter characteristics can be changed in accordance with the S/N ratio of the capacitance.

The change in the filter characteristics is made by the processing device 120 that calculates the filter parameter α on the basis of the difference value. The configuration of the processing device 120 and a particular process performed by the processing device 120 are described below.

The processing device 120 includes a main control unit 121, a capacitance detection unit 122, a reference value acquisition unit 123, a difference value calculation unit 124, a filter parameter calculation unit 125, a filter calculation unit 126, a determination unit 127, and a memory 128.

The main control unit 121, the capacitance detection unit 122, the reference value acquisition unit 123, the difference value calculation unit 124, the filter parameter calculation unit 125, the filter calculation unit 126, and the determination unit 127 are functional blocks representing the functions of a capacitance detection program executed by the processing device 120. In addition, the memory 128 functionally represents the memory of the processing device 120.

The main control unit 121 is a control unit that performs overall control of the processing performed by the processing device 120. The main control unit 121 performs the processing other than the processing performed by the capacitance detection unit 122, the reference value acquisition unit 123, the difference value calculation unit 124, the filter parameter calculation unit 125, the filter calculation unit 126, and the determination unit 127.

The capacitance detection unit 122 detects the capacitance value of the detection electrode 111 of the sensor unit 110. More specifically, the capacitance detection unit 122 is connected to the detection electrode 111, detects the capacitance value between the detection electrode 111 and the ground potential point (GND), and stores data representing the detected capacitance value in the memory 128.

The reference value acquisition unit 123 acquires a reference value on the basis of the capacitance value detected by the capacitance detection unit 122. Herein, the reference value acquisition unit 123 acquires, as a reference value, the capacitance value when the detection target is not in proximity to the detection electrode 111 of the sensor unit 110 and stores the reference value in the memory 128. The reference value is used when the difference value calculation unit 124 calculates the difference value between a capacitance value and the reference value.

The difference value calculation unit 124 calculates the difference value between a capacitance value detected by the capacitance detection unit 122 and the reference value acquired by the reference value acquisition unit 123 and stores the difference value in the memory 128.

The filter parameter calculation unit 125 calculates a filter parameter α on the basis of the difference value calculated by the difference value calculation unit 124 and stores the filter parameter α in the memory 128. The filter parameter α is a variable that determines the filter characteristics of the capacitive sensor 100.

The filter parameter calculation unit 125 calculates the filter parameter α on the basis of the difference value that dynamically changes in accordance with the change in the degree of proximity of the detection target to the sensor unit 110. The value of the filter parameter α calculated by the filter parameter calculation unit 125 dynamically changes in accordance with a change in the degree of proximity of the detection target to the sensor unit 110. More specifically, the filter parameter calculation unit 125 calculates the filter parameter α such that the response time decreases with increasing difference value calculated by the difference value calculation unit 124.

The filter parameter α is calculated by the following equation (1):

$$\alpha = A * V(t) + B \qquad (1)$$

V(t) is the difference value, and A and B are coefficients that determine the characteristics of the filter parameter α corresponding to the difference value V(t). For example, A=0.875, B=0.125, and the sum of A and B is 1.

The filter parameter α increases with increasing difference value V(t). The lowpass filter is weakened more (the cutoff frequency increases) with increasing filter parameter α and, thus, the response to the input to the lowpass filter becomes faster. In contrast, the lowpass filter is strengthened more (the cutoff frequency decreases) with decreasing value of the filter parameter α and, thus, the output response to the input to the lowpass filter becomes slower.

Normally, the filter parameter α is a variable that satisfies 0<α≤1. However, in some cases, the filter parameter calculation unit 125 corrects the filter parameter α calculated using equation (1) so that the filter parameter α satisfies 0.125α≤1.

In addition, while the embodiment is described herein with reference to a filter parameter α represented as a linear function, the equation used to derive the filter parameter α is not limited to a linear function. Since the value of the filter parameter α needs to change continuously, the filter parameter α may be proportional to the square of the difference value V(t) or may be inversely proportional to the difference value V(t) or the square of the difference value V(t), for example. The equation representing the filter parameter α can be an equation appropriate for the usage of the capacitive sensor 100 and the like.

The filter calculation unit 126 calculates a filter calculation value Vf(t) by performing a time-directional filtering process on the difference value V(t) using the filter parameter α. That is, the filter calculation unit 126 uses the filter parameter α calculated by the filter parameter calculation unit 125 to perform a filtering process for obtaining the moving average of the difference values V(t) calculated by the difference value calculation unit 124. Thus, the filter calculation unit 126 calculates the filter calculation value Vf(t). The filtering process for obtaining the moving average of the difference values is an example of applying the time-directional filtering process to the difference value V(t). In this example, the filter calculation unit 126 calculates the filter calculation value Vf(t) by performing a time-directional filtering process using an exponential moving average as the moving average. In addition, the filter calculation value is a difference value subjected to the filtering process. Furthermore, as described above, the filter parameter calculation unit 125 increases the filter parameter α with increasing difference value calculated by the difference value calculation unit 124. Note that this is the case where the filtering process using the exponential moving average is performed.

More specifically, the filter calculation unit 126 calculates the filter calculation value Vf(t) using the following equation (2):

$$Vf(t)\alpha*V(t)+(1-\alpha)*Vf(t-1) \qquad (2)$$

Equation (2) is an equation for obtaining the filter calculation value Vf(t) as an exponential moving average of the difference values V(t). Vf(t−1) is a filter calculation value obtained in the immediately previous calculation and is a filter calculation value reflecting all the previous difference values up to the immediately previous calculation.

Since the weight of the average value of the difference values up to the immediately previous calculation increases with decreasing value of the filter parameter α, the lowpass filter is strengthened and, thus, the response of the output (Vf(t)) to the input (V(t)) is slow. In contrast, since the weight of the average value of the difference values up to the immediately previous calculation decreases with increasing value of the filter parameter α, the lowpass filter is weakened and, thus, the response of the output (Vf(t)) to the input (V(t)) is fast.

The determination unit 127 determines the condition around the sensor unit 110 on the basis of the filter calculation value calculated by the filter calculation unit 126. More specifically, the determination unit 127 determines the degree of proximity between the detection electrode 111 and the detection target on the basis of the filter calculation value calculated by the filter calculation unit 126 and outputs data representing the determination result. Note that the degree of proximity indicates, for example, one of the following conditions: The detection target is in contact with the sensor unit 110 (a touch mode), the detection target is present at a position slightly (for example, several cm) away from the sensor unit 110 (a hover mode), and the detection target is not present in proximity of the sensor unit 110 (a non-proximity mode).

The memory 128 stores programs and data used by the processing device 120 when the processing device 120 performs processing. The processing performed by the processing device 120 is described below. The processing device 120 executes a capacitance detection program and, thus, performs the processing described below with reference to FIGS. 2 to 4. In addition, a method implemented by the processing device 120 that executes the capacitance detection program is the capacitance detection method.

That is, according to the present embodiment, the capacitance detection method includes a capacitance detection step of detecting the capacitance value of the detection electrode 111 of the sensor unit 110 having the detection electrode 111, a difference value calculation step of calculating the difference value V(t) between the capacitance value and the reference value, a filter calculation step of calculating the filter calculation value Vf(t) by performing a time-directional filtering process on the difference value V(t) using the filter parameter α, a determination step of determining a condition around the sensor unit 110 on the basis of the filter calculation value Vf(t) calculated in the filter calculation step, and a filter parameter calculation step of calculating the filter parameter α on the basis of the difference value V(t) calculated in the difference value calculation step.

Furthermore, according to the present embodiment, a capacitance detection program causes a computer to perform processing including a capacitance detection step of detecting the capacitance value of the detection electrode 111 of the sensor unit 110 having the detection electrode 111, a difference value calculation step of calculating the difference value V(t) between the capacitance value and the reference value, a filter calculation step of calculating the filter calculation value Vf(t) by performing a time-directional filtering process on the difference value V(t) using the filter parameter α, a determination step of determining a condition around the sensor unit 110 on the basis of the filter calculation value Vf(t) calculated in the filter calculation step, and a filter parameter calculation step of calculating the filter parameter α on the basis of the difference value V(t) calculated in the difference value calculation step.

Figure 2:
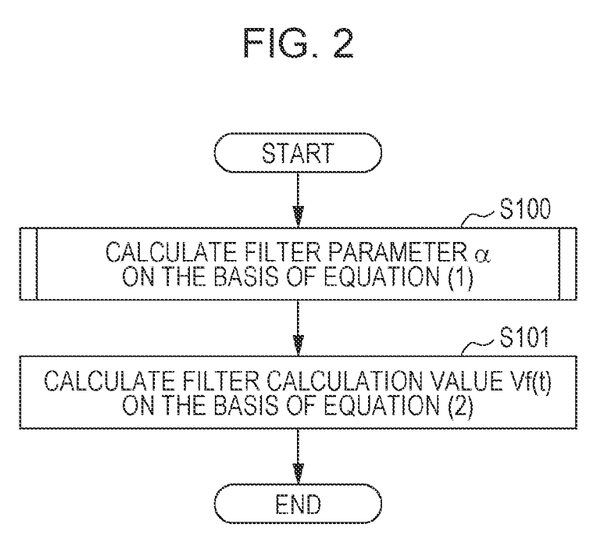
FIG. 2 is a flowchart illustrating a process performed to calculate a filter parameter and a filter calculation value.

FIG. 2 is a flowchart illustrating the processing performed when the filter parameter calculation unit 125 and the filter calculation unit 126 calculate the filter parameter α and the filter calculation value Vf(t), respectively.

As illustrated in FIG. 2, when the processing starts, the filter parameter calculation unit 125 calculates the filter parameter α on the basis of equation (1) first (step S100). Note that as described in more detail below, when calculating the filter parameter α, the filter parameter calculation unit 125 performs the calculation such that the filter parameter α falls within a predetermined range.

Subsequently, the filter calculation unit 126 calculates the filter calculation value Vf(t) on the basis of equation (2) using the filter parameter α calculated in step S100 (step S101).

Through the above-described steps, the process of calculating the filter parameter α and the filter calculation value Vf(t) is completed (end).

Figure 3:
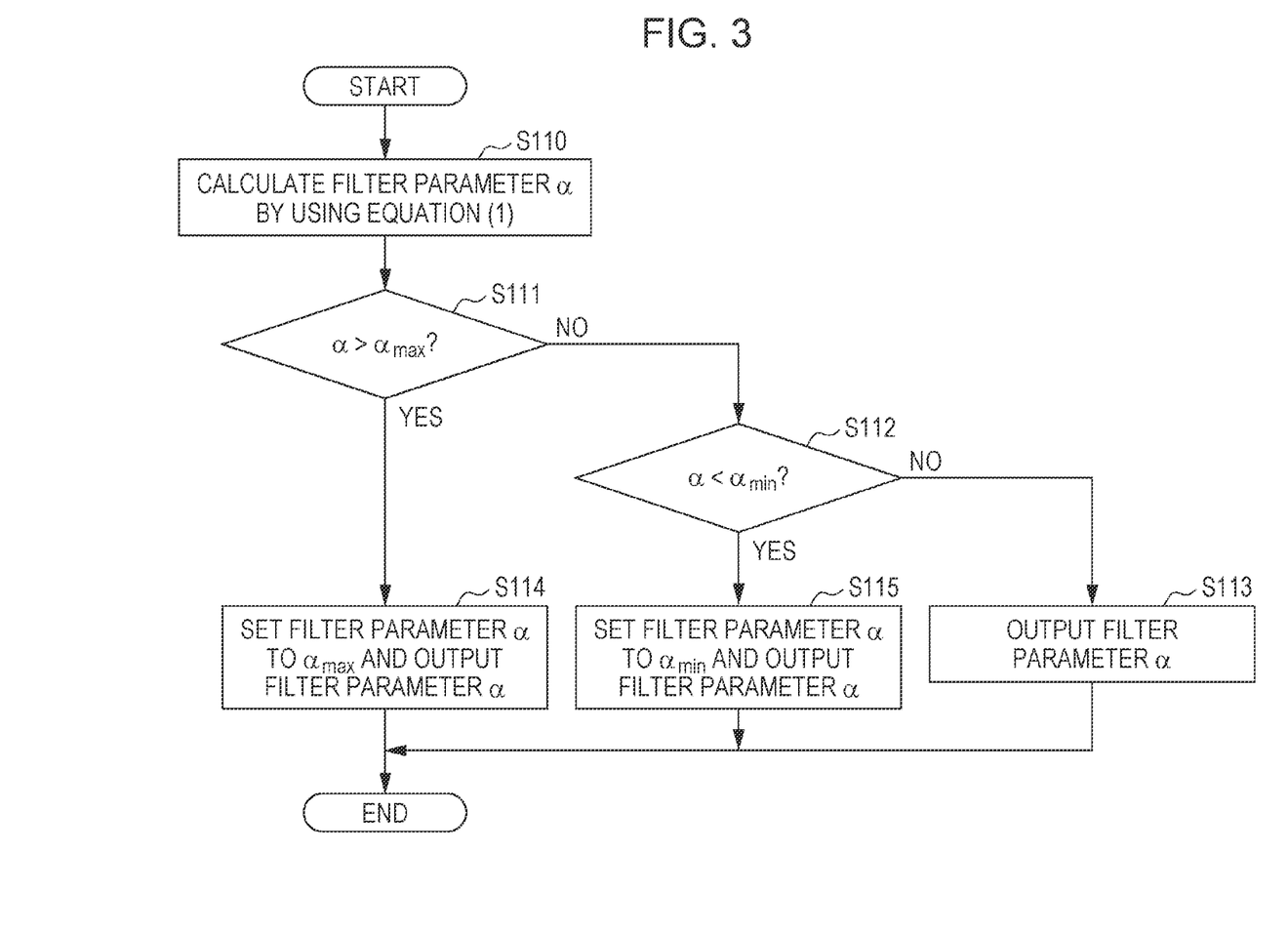
FIG. 3 is a flowchart illustrating the process performed in step S100 illustrated in FIG. 2.

The details of the process in step S100 are illustrated in FIG. 3. FIG. 3 is a flowchart illustrating the process in step S100 illustrated in FIG. 2.

When the process starts, the filter parameter calculation unit 125 calculates the filter parameter α by using equation (1) (step S110).

The filter parameter calculation unit 125 determines whether the calculated filter parameter α is greater than αmax (step S111). The value αmax is the maximum value that the filter parameter α can take. For example, the value αmax is 1 in this example.

If the filter parameter calculation unit 125 determines that the calculated filter parameter α is not greater than αmax (S111: NO), the filter parameter calculation unit 125 determines whether the calculated filter parameter α is less than αmin (step S112). The value αmin is the minimum value that the filter parameter α can take. For example, the value αmin is 0.125 in this example.

If the filter parameter calculation unit 125 determines that the calculated filter parameter α is not less than αmin (S112: NO), the filter parameter calculation unit 125 outputs the calculated filter parameter α (step S113). The flow proceeds to step S113 if the calculated filter parameter α is greater than or equal to 0.125 and less than or equal to 1.

However, if the filter parameter calculation unit 125 determines in step S111 that the calculated filter parameter α is greater than αmax (S111: YES), the filter parameter calculation unit 125 sets the filter parameter α to αmax and outputs the filter parameter α (step S114). Through the process in step S114, the filter parameter α is corrected to 1. The value αmax is the maximum value of the filter parameter α under the condition that the responsiveness (the response speed) is required rather than noise immunity.

If the filter parameter calculation unit 125 determines in step S112 that the calculated filter parameter α is less than αmin (S112: YES), the filter parameter calculation unit 125 sets the filter parameter α to αmin and outputs the filter parameter α (step S115). Through the process in step S115, the filter parameter α is corrected to 0.125. The value αmin is the minimum value of the filter parameter α when noise immunity is required rather than responsiveness (the response speed). The minimum value can be selected as, for example, a value that gives the minimum required response speed even when the response is the slowest.

When the processes in steps S113, S114, and S115 are completed, the filter parameter calculation unit 125 ends the series of processes (end).

The reason why A is set to 0.875 and B is set to 0.125 as an example in equation (1) used in step S110 is as follows. For example, the count number of the difference value V(t) obtained when the detection target is touching the sensor unit 110 is 100, and the count number of the difference value V(t) obtained when the detection target is not detected is 0. If the value αmin, which is the minimum value of the filter parameter α when noise immunity is required as described above, is set to 0.125, αmax is 1. For this reason, A and B are set to 0.875 and 0.125, respectively.

When the capacitance value is high and the difference value V(t) is high, a sufficiently high S/N ratio can be obtained through the processing illustrated in FIG. 3. Therefore, the filter parameter α is set to a high value to weaken the filter. Thus, the cutoff frequency is increased, and the responsiveness is improved.

When the capacitance value is low and the difference value V(t) is low, the S/N ratio is low. Therefore, the filter parameter α is set to a low value to strengthen the filter. Thus, the cutoff frequency is decreased, and the responsiveness is deteriorated.

That is, it is intended that under the condition that the S/N ratio is high, the responsiveness is given priority, and the filter is weakened. Under the condition that the S/N ratio is low, the filter is strengthened even though the responsiveness is sacrificed to some extent.

Figure 4:
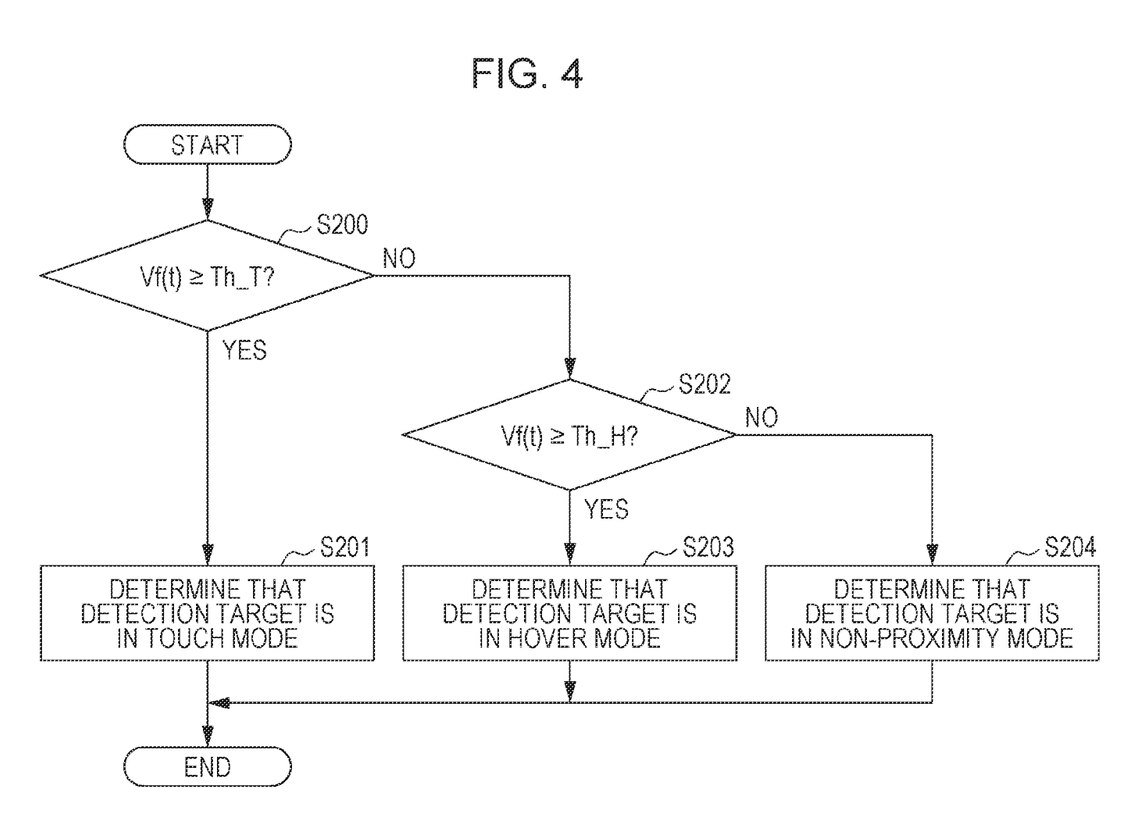
FIG. 4 is a flowchart illustrating the process performed by a determination unit.

FIG. 4 is a flowchart illustrating the process performed by the determination unit 127. The determination unit 127 determines that the detection target is in a touch mode if the filter calculation value Vf(t) calculated by the filter calculation unit 126 is greater than or equal to a predetermined first threshold value Th_T, determines that the detection target is in a hover mode if the filter calculation value Vf(t) is less than the first threshold value Th_T and greater than or equal to a predetermined second threshold value Th_H, and determines that the detection target is in a non-proximity mode if the filter calculation value Vf(t) is less than the second threshold value Th_H.

More specifically, when the process starts, the determination unit 127 determines whether the filter calculation value Vf(t) is greater than or equal to the threshold value Th_T (step S200). The threshold value Th_T is a threshold value used for determining whether the detection target is in the touch mode and is an example of the first threshold value.

If the determination unit 127 determines that the filter calculation value Vf(t) is greater than or equal to the threshold value Th_T (S200: YES), the determination unit 127 determines that the detection target is in the touch mode (step S201).

However, if the determination unit 127 determines in step S200 that the filter calculation value Vf(t) is not greater than and not equal to the threshold value Th_T (S200: NO), the determination unit 127 determines whether the filter calculation value Vf(t) is greater than or equal to the threshold value Th_H (step S202). The threshold value Th_H is a threshold value used for determining whether the detection target is in the hover mode and is an example of the second threshold value.

If the determination unit 127 determines that the filter calculation value Vf(t) is greater than or equal to the threshold value Th_H (S202: YES), the determination unit 127 determines that the detection target is in the hover mode (step S203).

However, if the determination unit 127 determines that the filter calculation value Vf(t) is not greater than and not equal to the threshold value Th_H (S202: NO), the determination unit 127 determines that the detection target is in the non-proximity mode (step S204).

When the processes in steps S201, S203, and S204 are completed, the determination unit 127 ends the series of processes (end).

Figure 5:
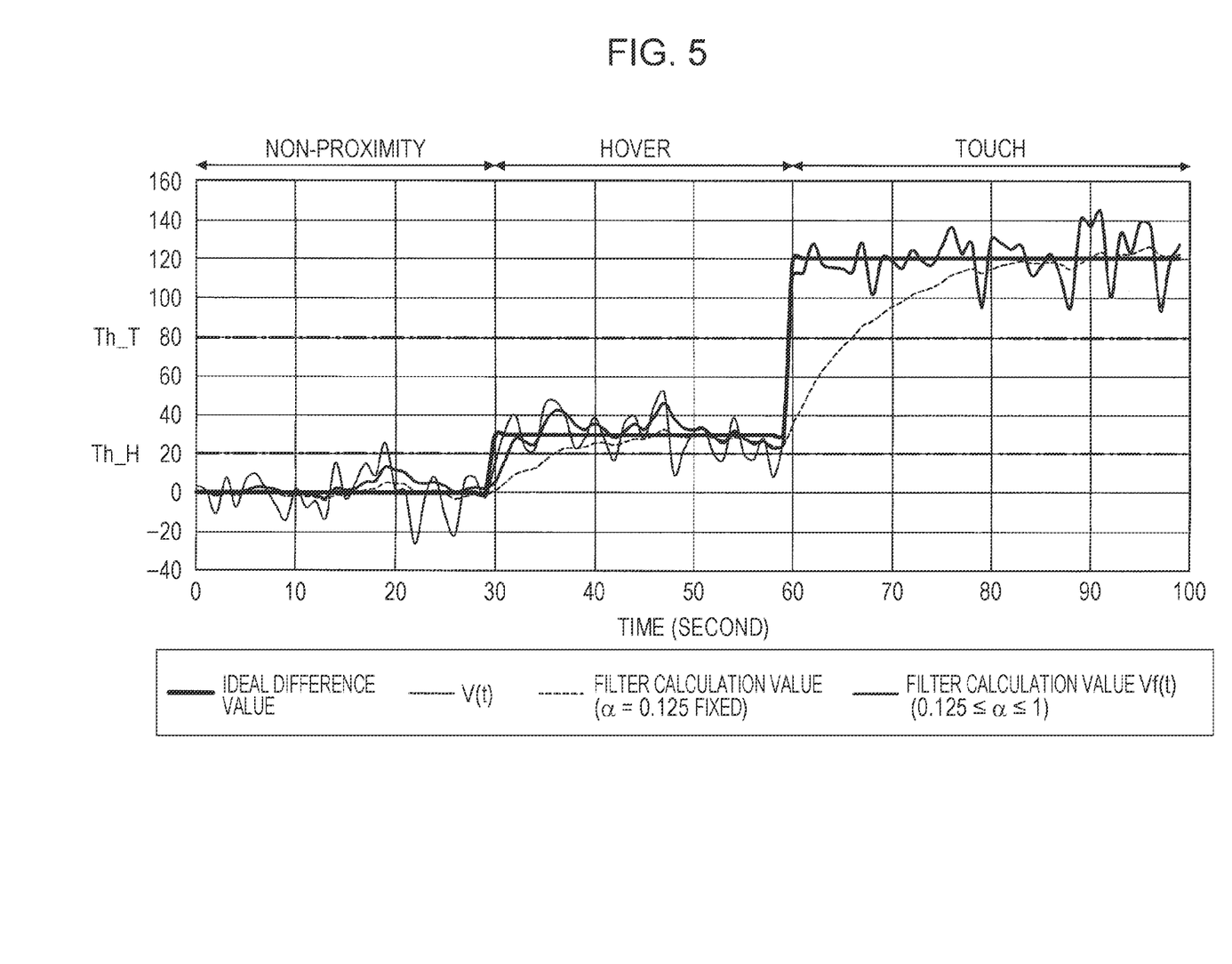
FIG. 5 is a diagram illustrating the characteristics of a difference value and a filter calculation value.

FIG. 5 is a diagram illustrating the characteristics of the difference value V(t) and the filter calculation value Vf(t). In FIG. 5, a filter calculation value Vf(t) is plotted when the mode of the detection target changes from the non-proximity mode to the hover mode and then to the touch mode. The abscissa represents the time (0 seconds to 100 seconds), and the ordinate represents the count value.

In addition to the filter calculation value Vf(t), the waveform of the difference value that is ideal (the ideal difference value) and the filter calculation value are plotted when the filter parameter α is fixed at 0.125 (α=0.125 fixed). The difference value V(t) is a waveform obtained by adding random noise to the ideal difference value. Furthermore, a threshold value Th_T used to determine the touch mode and a threshold value Th_H used to determine the hover mode are illustrated.

Figure 6:
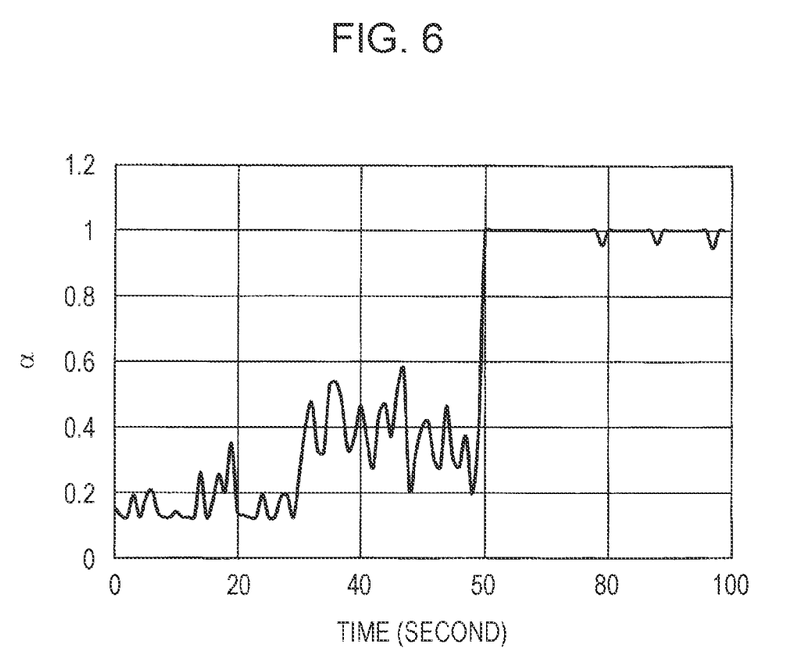
FIG. 6 is a diagram illustrating the characteristics of the filter parameter.

Furthermore, the filter calculation value Vf(t) is described with reference to FIG. 6 in addition to FIG. 5. FIG. 6 illustrates the characteristics of the filter parameter α.

As illustrated in FIG. 5, the ideal difference value is based on the data when the target object enters the hover mode at 30 seconds and enters the touch mode at 60 seconds. The ideal difference value is 0 counts from 0 seconds to 29 seconds, 30 counts from 30 seconds to 59 seconds, and 120 counts at 60 seconds or later.

The difference value V(t) including noise does not fall below the touch threshold Th_T during a touch mode period (60 seconds or later) and, thus, no problem arises in touch determination. However, there are an instant at which the difference value V(t) exceeds the hover threshold value Th_H although the target object is not in the proximity and an instant at which the difference value V(t) falls below the hover threshold value Th_H although the target object is in the hover mode.

Furthermore, as illustrated in FIG. 5, the filter calculation value obtained when the filter parameter α is fixed at 0.125 is subjected to noise averaging processing based on the exponential moving average processing with a heavier filter parameter α (0.125). For this reason, the filter calculation value does not exceed the hover threshold value Th_H during the non-proximity mode period (from 0 seconds to 29 seconds). During the initial 30 to 38 seconds of the hover mode period (from 30 seconds to 59 seconds), the filter calculation value does not exceed the hover threshold value Th_H due to deterioration of the responsiveness, which is a trade-off for the strength of the filter, but after the filter calculation value exceeds the hover threshold value Th_H at 39 seconds, the filter calculation value does no longer fall below the hover threshold value Th_H.

However, the filter calculation value when the filter parameter α is fixed at 0.125 causes a decrease in responsiveness even in the touch mode at 60 seconds and later, and a delay of about 7 seconds occurs before the filter calculation value exceeds the touch threshold value Th_T.

In contrast, in terms of the filter calculation value Vf(t), the filter parameter α is switched dynamically in the range of 0.125 to 1 in accordance with the difference value V(t). For this reason, as in the non-proximity mode (from 0 seconds to 30 seconds) illustrated in FIG. 5, during the period in which V(t) is close to 0, the filter parameter α has a very low value as illustrated in FIG. 6 and, thus, the filter calculation value Vf(t) almost overlaps the filter calculation value when the filter parameter α is fixed at 0.125.

In the hover mode (from 30 seconds to 60 seconds), the value of the filter parameter α is greater than 0.125 as illustrated in FIG. 6, but is a relatively small value. Therefore, as illustrated in FIG. 5, the filter calculation value Vf(t) can obtain the effect of the exponential moving average. As illustrated in FIG. 5, in the non-proximity mode (from 0 seconds to 30 seconds) and the hover mode (from 30 seconds to 60 seconds), there is not much difference between the filter calculation value Vf(t) and the filter calculation value obtained when the filter parameter α is fixed at 0.125.

Subsequently, after 60 seconds at which the detection target touches the sensor unit 110, the value of the filter parameter α becomes a value close to 1 as illustrated in FIG. 6, and the filter is almost ineffective. For this reason, in the touch mode at 60 seconds and later, the filter calculation value Vf(t) is substantially the same as the difference value V(t) as illustrated in FIG. 5, and it can be seen that the responsiveness at the time of touch is improved.

As described above, the filter calculation value Vf(t) is calculated as the exponential moving average of the difference value V(t) by using the filter parameter α calculated on the basis of the difference value V(t). As a result, when the difference value V(t) is low, the filter parameter α is low and, thus, the lowpass filter is strengthened, and noise is reduced. In contrast, when the difference value V(t) is high, the filter parameter α is high and, thus, the lowpass filter is weakened, which improves the responsiveness. In addition, when the difference value is high, the S/N ratio is high, and when the difference value is low, the S/N ratio is also low.

Therefore, the capacitive sensor 100, the capacitance detection method, and the capacitance detection program can be provided that reduce the false operation ratio when an object to be detected is distant from the capacitive sensor 100 and that do not deteriorate the responsiveness when the object to be detected is in close proximity.

The filter calculation value Vf(t) obtained by the capacitive sensor 100, the capacitance detection method, and the capacitance detection program according to the embodiment improves the responsiveness of the determination as to whether the object to be detected is in the touch mode, the hover mode, or the non-proximity mode, as compared with the case where the filter parameter α is a fixed value. In addition, the filter calculation value Vf(t) can reduce the risk of erroneous determination.

Furthermore, the filter parameter calculation unit 125 calculates the filter parameter α such that the responsiveness is improved more (the response time is reduced) with increasing difference value V(t). When the difference value V(t) is high, the capacitance value is high, and the S/N ratio is sufficiently high. As a result, the responsiveness can be improved by decreasing the strength of the lowpass filter. In contrast, when the difference value V(t) is low, the capacitance value is low, and the S/N ratio is low. As a result, it is possible to avoid an erroneous operation by increasing the strength of the lowpass filter to remove noise.

Furthermore, since the capacitive sensor 100 includes the reference value acquisition unit 123 that acquires a reference value on the basis of the capacitance value, an appropriate reference value can be used regardless of a change in the external environment, such as a temperature.

Furthermore, since the capacitance value is acquired as the reference value when the detection target is not in proximity to the detection electrode 111 of the sensor unit 110, the reference value can be stably acquired under a predetermined condition.

Furthermore, since the degree of proximity between the detection electrode 111 and the detection target can be determined on the basis of the filter calculation value Vf(t), the degree of proximity can be determined on the basis of the filter calculation value calculated corresponding to the capacitance value between the detection electrode 111 and the detection target.

Furthermore, since the degree of proximity is determined using the threshold value Th_T and the threshold value Th_H, the determination of one of the touch mode, the hover mode, and the non-proximity mode can be stably made.

Furthermore, since the filter calculation value is calculated by performing the filtering process based on the exponential moving average on the difference value V(t), noise can be reduced and, thus, the degree of proximity can be appropriately determined. Still furthermore, the filtering process based on an exponential moving average requires, as the previous calculation value, only the immediately previous filter calculation value Vf(t−1) to be stored in the memory 128. Thus, only one previous data is sufficient, which reduces the capacity of the memory 128 used to store previous data. As a result, calculations can be performed rapidly.

Furthermore, the filter parameter α is increased with increasing difference value V(t). For this reason, by increasing the filter parameter α when the difference value V(t) is high, the filter strength can be decreased and, thus, the responsiveness can be improved. In contrast, the filter parameter α is decreased with decreasing difference value V(t). For this reason, by decreasing the filter parameter when the difference value is low, the strength of the filter is increased and, thus, noise is reduced. In this manner, the S/N ratio can be increased.

Furthermore, when the filter parameter α is calculated, the calculation is made such that the filter parameter α falls within a predetermined range. As a result, the exponential moving average can be calculated stably, and an appropriate filter calculation value Vf(t) can be obtained.

Since the minimum value of the filter parameter α is a parameter when the difference value is low (when the detection target is distant), a low value should be set to avoid malfunction caused by noise. However, the lower value deteriorates the responsiveness more. Accordingly, the lowest value is set that provides the responsiveness that a customer satisfies. In contrast, since the maximum value of the filter parameter α is a parameter when the difference value is high (when the detection target is in contact), the S/N ratio is sufficiently high and, thus, too high noise immunity is not required. As a result, the maximum value of the filter parameter α can be set to a high value.

While the embodiment has been described above with reference to the filter parameter α obtained using equation (1), a digital lowpass filtering process may be performed when the filter parameter α is calculated. This is because the digital lowpass filtering process can prevent a sudden change in the filter parameter α.

Furthermore, while the embodiment has been described above with reference to the calculation of the filter calculation value Vf(t) using the exponential moving average, the filter calculation unit 126 may calculate the filter calculation value Vf(t) by performing a time-directional filtering process using the simple moving average. For example, the difference value V(t−1) obtained one calculation ago to the difference value V(t−(N−1)) obtained (N−1) calculations ago are stored in the memory 128, and the average of N difference values including the most recent difference value V(t) may be obtained as the filter calculation value Vf(t). The average of the N difference values can be calculated using the following equation (3):

$$Vf(t) = \frac{V(t) + V(t-1) + \cdots + V(t-(N-1))}{N} \quad (3)$$

In this case, the filter parameter is N, and unlike the case of the exponential moving average, the filter parameter calculation unit 125 decreases the filter parameter N with increasing difference value V(t) calculated by the difference value calculation unit 124. That is, the filter parameter calculation unit 125 can output a lower value N as the difference value V(t) increases. A lower value N increases the ratio of the most recent difference value V(t), so that a weaker lowpass filter and a greater value of N decreases the ratio of the most recent difference value V(t) and, thus, the lowpass filter is strengthened.

When the difference value V(t) is high, the lowpass filter may be weak, and when the difference value V(t) is low, the lowpass filter needs to be strengthened. Thus, the lowpass filter need to output a lower value N with increasing difference value V(t).

By performing a filtering process based on a simple moving average, noise can be reduced, and the degree of proximity can be appropriately determined.

While the capacitive sensor, the capacitance detection method, and the capacitance detection program according to the exemplary embodiment of the present invention have been described above, the present invention is not limited to the particularly described embodiment, and various modifications and changes can be made without departing from the scope of claims.

What is claimed is:

1. A capacitive sensor comprising:
   a sensor unit including a detection electrode configured to form a capacitance with an object approaching thereto;
   a capacitance detection unit configured to detect a capacitance value of the detection electrode of the sensor unit, the capacitance value changing in accordance with a state of approach of the object;
   a difference value calculation unit configured to calculate a difference value between the capacitance value and a reference value;
   a filter calculation unit configured to perform a time-directional filtering process on the difference value using a filter parameter, thereby calculating a filter calculation value;
   a determination unit configured to determine a condition with respect to the object in a vicinity of the sensor unit based on the filter calculation value calculated by the filter calculation unit; and
   a filter parameter calculation unit configured to dynamically calculate the filter parameter depending on the difference value calculated by the difference value calculation unit.

2. The capacitive sensor according to claim 1, wherein the filter parameter calculation unit is configured to calculate the filter parameter such that a response time of the filtering process decreases as the difference value calculated by the difference value calculation unit increases.

3. The capacitive sensor according to claim 1, further comprising:
   a reference value acquisition unit configured to acquire the reference value based on the capacitance value detected by the capacitance detection unit.

4. The capacitive sensor according to claim 3, wherein the reference value is the capacitance value detected when no detection target is approaching the detection electrode.

5. The capacitive sensor according to claim 1, wherein the determination unit is configured to determine a degree of proximity between the detection electrode and the object, which is a detection target, based on the filter calculation value.

6. The capacitive sensor according to claim 1, wherein the determination unit is further configured to determine that the object, which is a detection target, is in a touch state if the filter calculation value is greater than or equal to a first threshold value, determine that the detection target is in a hover state if the filter calculation value is less than the first threshold value and greater than or equal to a second threshold value, and determine that the detection target is in a non-proximity state if the filter calculation value is less than the second threshold value.

7. The capacitive sensor according to claim 1, wherein the filter calculation unit is configured to perform the time-directional filtering process by calculating an exponential moving average using the filter parameter.

8. The capacitive sensor according to claim 7, wherein the filter parameter calculation unit is configured to increase the filter parameter as the difference value increases.

9. The capacitive sensor according to claim 1, wherein the filter calculation unit is configured to perform the time-directional filtering process by calculating a simple moving average using the filter parameter.

10. The capacitive sensor according to claim 9, wherein the filter parameter calculation unit is configured to decrease the filter parameter as the difference value increases.

11. The capacitive sensor according to claim 1, wherein the filter parameter calculation unit is further configured to set the filter parameter within a predetermined range after calculating the filter parameter.

12. A capacitance detection method using a sensor unit including a detection electrode, the method comprising:
- a capacitance detection step of detecting a capacitance value of the detection electrode, the capacitance value changing in accordance with an object approaching the detection electrode;
- a difference value calculation step of calculating a difference value between the capacitance value and a reference value;
- a filter calculation step of performing a time-directional filtering process on the difference value using a filter parameter, thereby calculating a filter calculation value;
- a determination step of determining a condition with respect to the object in a vicinity of the sensor unit based on the filter calculation value calculated in the filter calculation step; and
- a filter parameter calculation step of dynamically calculating the filter parameter depending on the difference value calculated in the difference value calculation step.

13. A non-transitory computer-readable storage medium with a capacitance detection program stored thereon, wherein the program instructs a computer to perform a process comprising:
- a capacitance detection step of detecting a capacitance value of a detection electrode of a sensor unit, the capacitance value changing in accordance with an object approaching the detection electrode;
- a difference value calculation step of calculating a difference value between the capacitance value and a reference value;
- a filter calculation step of performing a time-directional filtering process on the difference value using a filter parameter, thereby calculating a filter calculation value;
- a determination step of determining a condition with respect to the object in a vicinity of the sensor unit based on the filter calculation value calculated in the filter calculation step; and
- a filter parameter calculation step of dynamically calculating the filter parameter depending on the difference value calculated in the difference value calculation step.

* * * * *